G. W. ODELL.
TIME RECORDER.
APPLICATION FILED JUNE 29, 1921.

1,421,824.

Patented July 4, 1922.

Inventor
George W. Odell,
By his Attorneys
Knr, Page, Cooper & Hayward

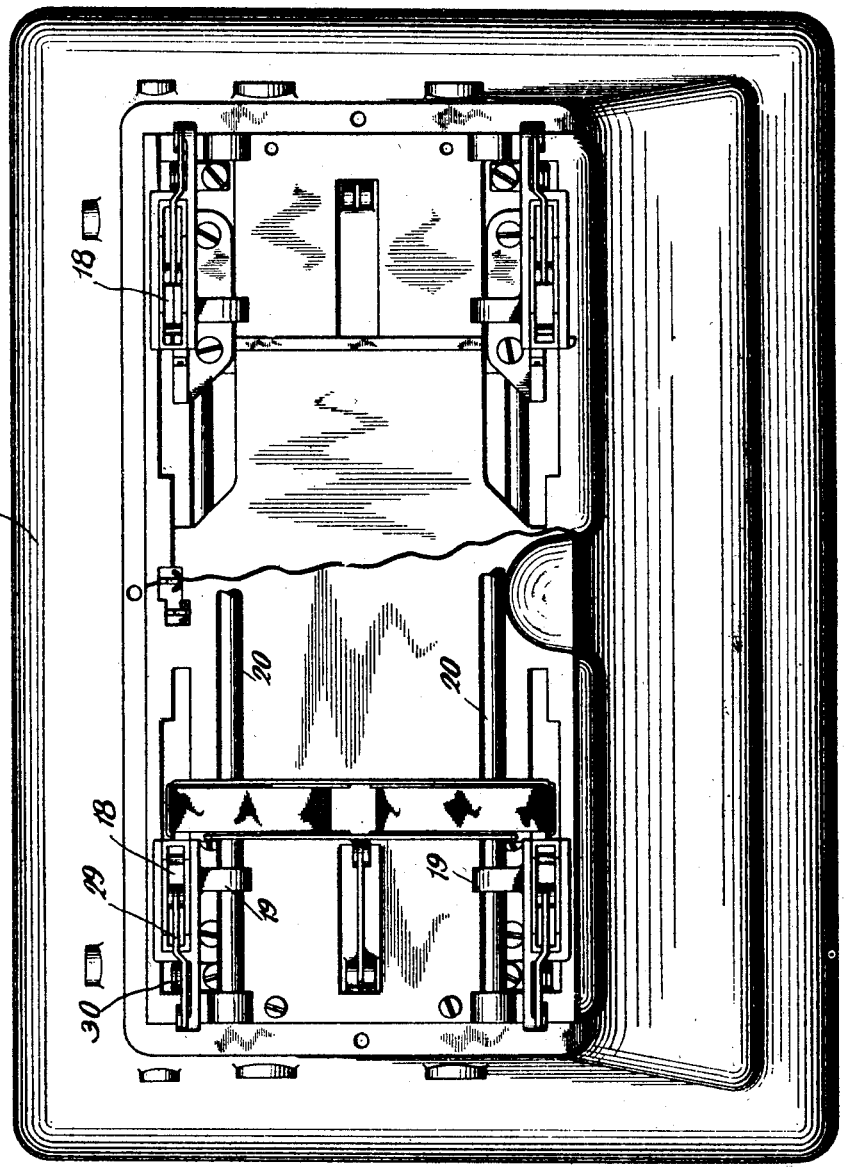

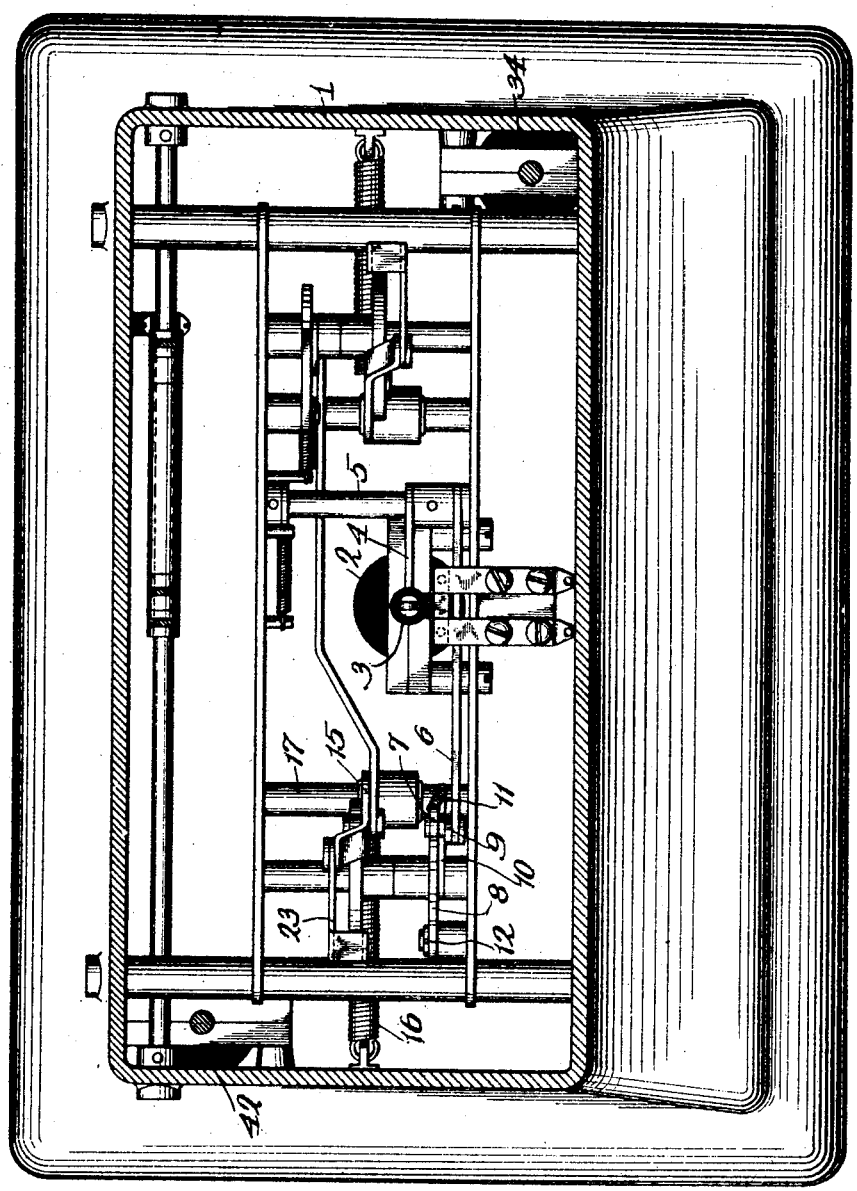

G. W. ODELL.
TIME RECORDER.
APPLICATION FILED JUNE 29, 1921.
1,421,824.
Patented July 4, 1922.
7 SHEETS—SHEET 4.
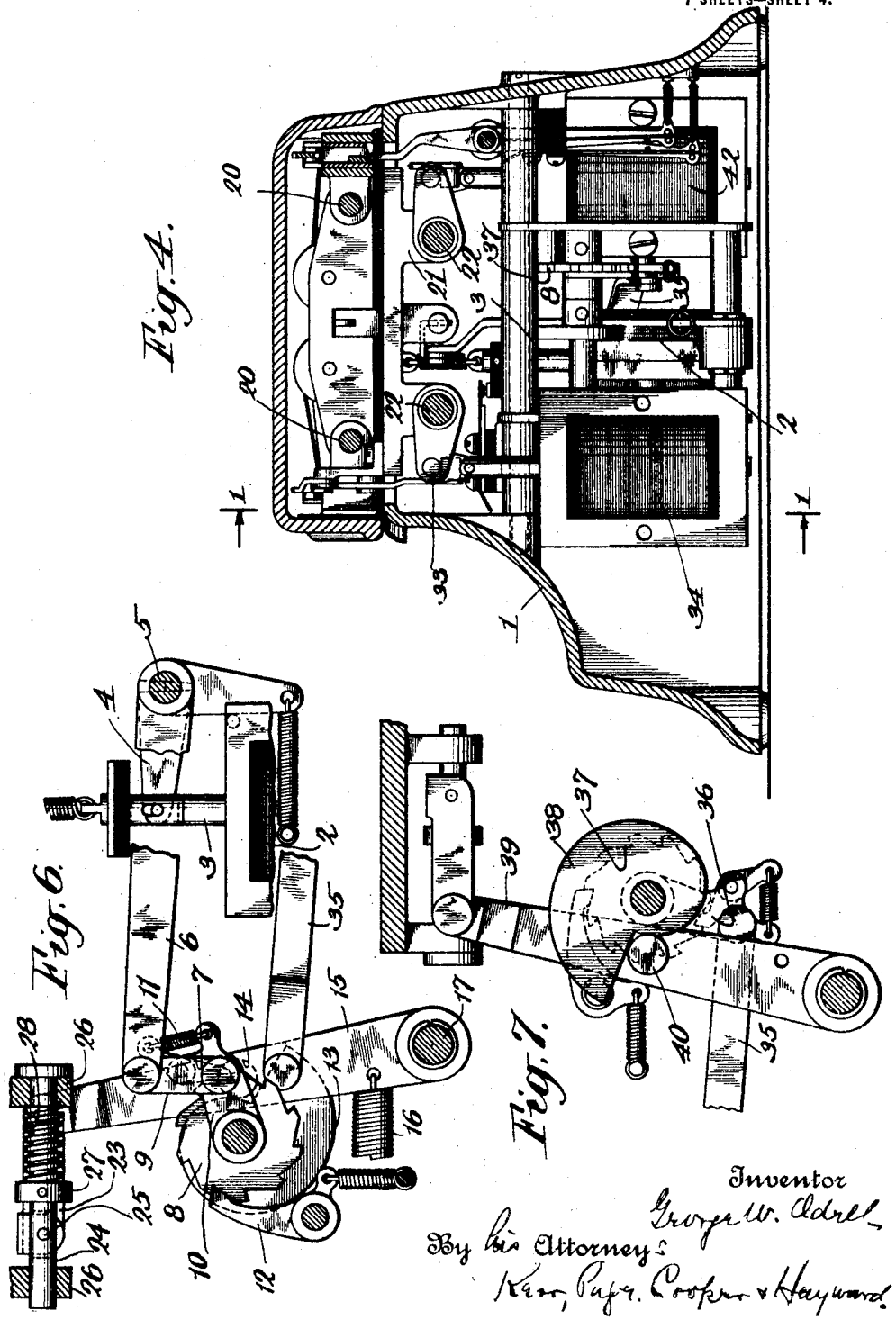

G. W. ODELL.
TIME RECORDER.
APPLICATION FILED JUNE 29, 1921.
1,421,824.
Patented July 4, 1922.
7 SHEETS—SHEET 5.
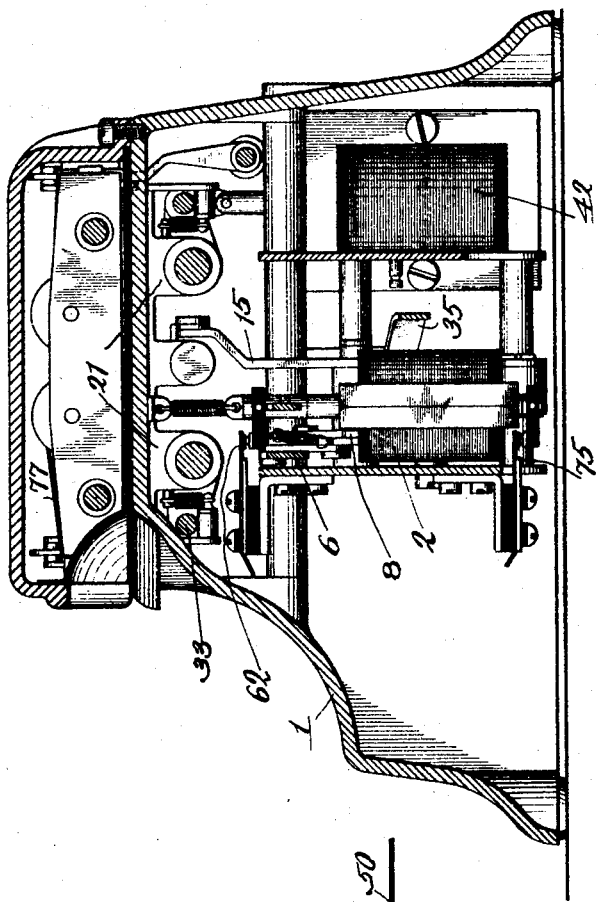
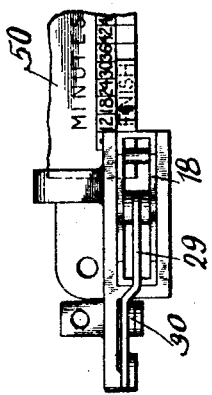
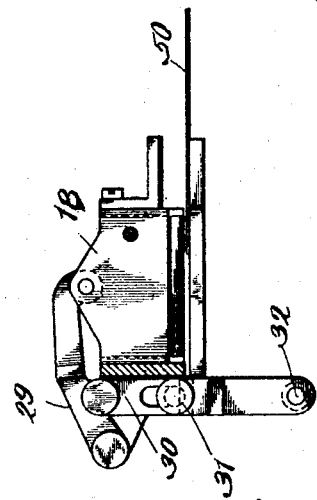
Inventor
George W. Odell
By his Attorneys
Kenyon, Page, Cooper & Hayward

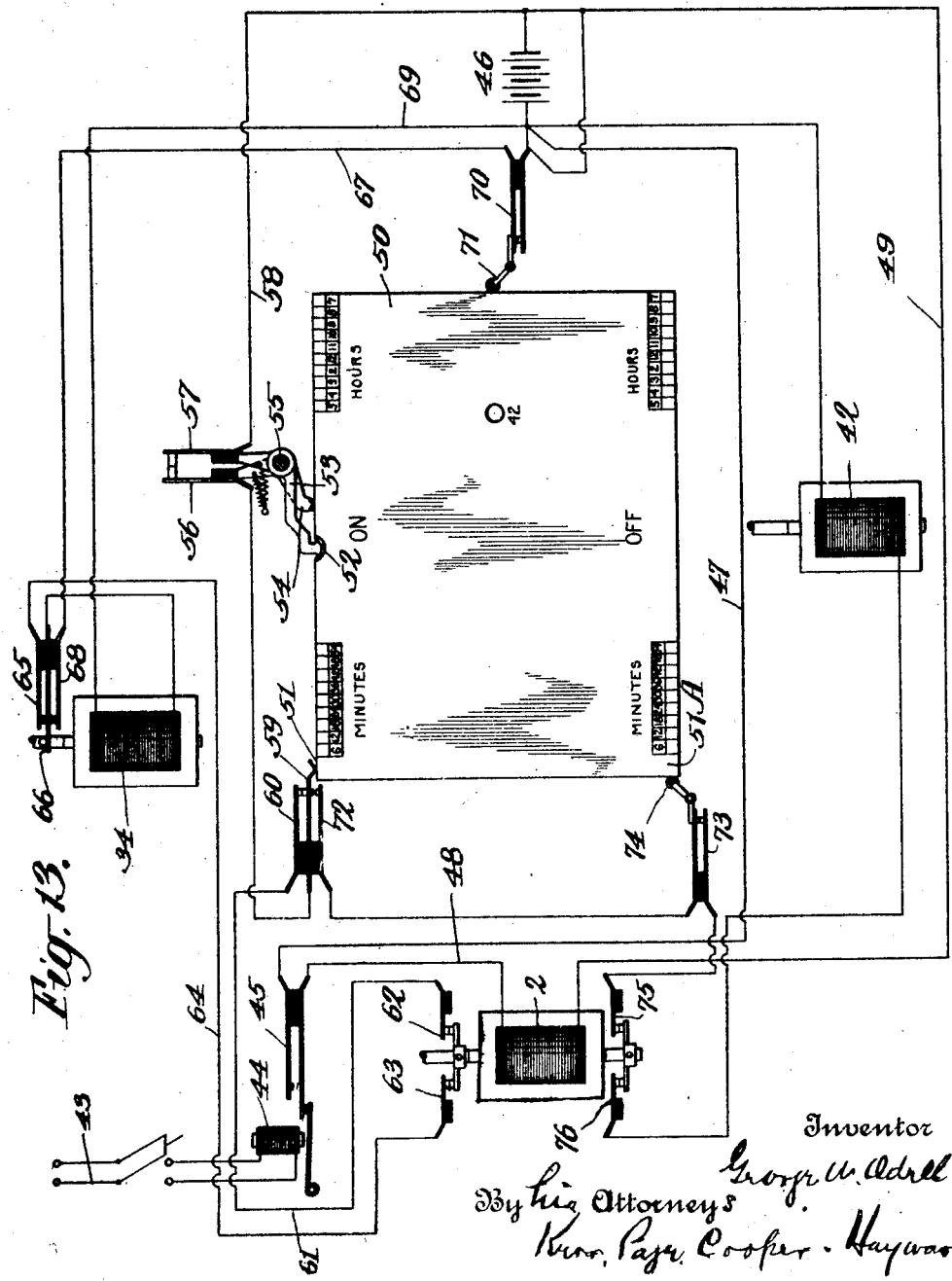

UNITED STATES PATENT OFFICE.

GEORGE WILLIAM ODELL, OF BINGHAMTON, NEW YORK, ASSIGNOR TO THE INTERNATIONAL TIME RECORDING COMPANY OF NEW YORK, A CORPORATION OF NEW YORK.

TIME RECORDER.

1,421,824.   Specification of Letters Patent.   Patented July 4, 1922.

Application filed June 29, 1921. Serial No. 481,196.

*To all whom it may concern:*

Be it known that I, GEORGE W. ODELL, a subject of the King of Great Britain, residing at Binghamton, in the county of Broome and State of New York, have invented certain new and useful Improvements in Time Recorders, of which the following is a full, clear, and exact description.

In certain branches of industry it is usual at the present time to have each employee make and preserve a record of the time spent on each job, for which purpose it is customary to use some form of time recorder into which the workman inserts a card at the start and finish of a job, and thereby prints or otherwise records thereon what is commonly known as his "on" and his "off" times. Some of these records print, others punch and still others cut out certain sections of these cards, from which cut-out sections, by another machine, the elapsed time is computed, printed or recorded and, if the card is provided with a definitely placed slot or perforation to indicate the rate of pay, the total amount due the workman for the time put into that particular job is also recorded.

I have heretofore devised and patented both cards and recorders of this last-named type, and for a more ready understanding of the art as it existed prior to the invention upon which is based the present application for Letters Patent by those not familiar with such art, I may refer to my Patents No. 1,221,895, dated April 10, 1917, and No. 1,250,494, dated December 18, 1917.

In these patents a card was inserted into the recorder and the latter operated to cut out along one side a section of a length from the corner dependent upon and indicating the "on" time. At the finish of the job the same card was again inserted in the machine and automatically a section was cut out from the opposite edge of the card of a length from the corner corresponding to the time at which the second insertion was made. Thus cards were produced having sections of different lengths cut out from corners at one end along opposite edges, and into a properly designed machine, such cards were introduced, which computed and set up a record of the elapsed time and money values corresponding to the difference in the lengths of the two cut-out sections and to the rate table previously made.

The present invention involves a recorder of this general type, but differing from that referred to in that when a card is introduced for the "on" time, it cuts out a section along one edge at each end of the card, one to indicate the minutes, the other the hours. On the second or "off" introduction of the card, the recorder cuts out a section at each end along the opposite edge of the card, one section indicating the elapsed minutes, the other the elapsed hours at the time of its second introduction. Each card, therefore, that indicates the elapsed time of a finished job, assuming it to have been inserted in the machine at other times than exactly on the even hour, will contain four cut-out sections, two on each edge and at opposite ends of the card.

There is a marked and important advantage in thus cutting a card, as in the first method above described the length of the cards required was almost prohibitive in practical operations, while by the method which is here involved a much smaller and shorter card is required for any ordinary record.

A card thus cut may be placed in another machine which automatically computes and records the elapsed time indicated by the cuts on the two edges, and makes, if necessary, other computations. Such machines are well known in this art, and I shall not go into a description of their character or mode of operation, as neither is in any way involved in the special improvement of this application which resides in the recording or card-cutting machine. The cards cut or designed to be cut by this machine will be made the subject of another application.

The machine which I have devised for this purpose is illustrated in the accompanying drawings:

Fig. 2 is a top plan and part sectional view of the said machine on the line 2—2 of Fig. 1.

Fig. 3 is a horizontal sectional plan view on the line 3—3 of Fig. 1.

Fig. 4 is a vertical sectional view on the line 4—4 of Fig. 1.

Fig. 5 is a central vertical section on the line 5—5 of Fig. 1.

Fig. 6 is a view in elevation and part section of a detail of a carriage-feeding mechanism.

Fig. 7 is a view of similar character of another part of said mechanism.

Figs. 8 and 9 are details of the cutting mechanism.

Fig. 13 is a wiring diagram of the machine.

Figure 1:
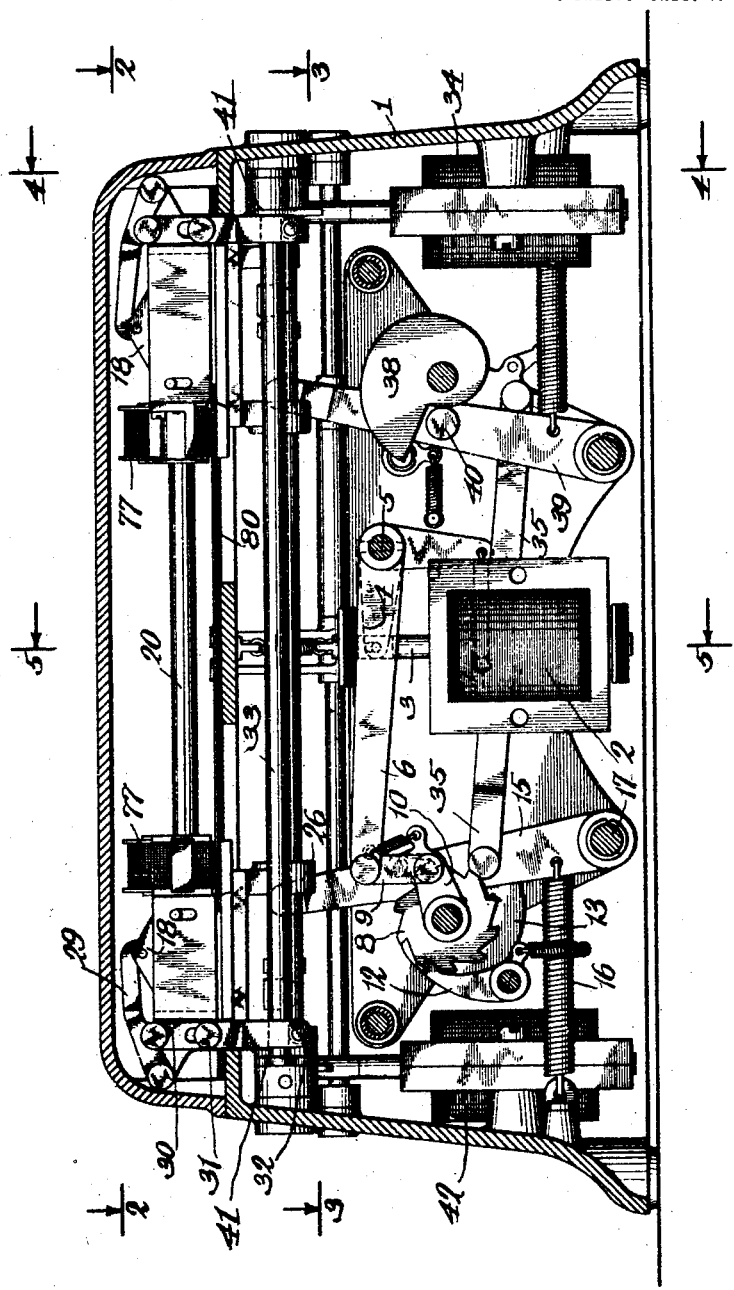
Figure 1 is a sectional view of the complete machine on the line 1—1 of Fig. 4.

The machine is contained in a suitable casing 1, and centrally located in such casing is an electro-magnet or preferably a solenoid 2, the core or plunger of which 3 connects, with suitable provision for the necessary lost motion, with an arm 4 that rocks a shaft 5, to which is rigidly secured an arm 6. This magnet or solenoid receives a current impulse under the control of a master clock at definite and regular intervals. Once every six minutes has been found to be the most desirable, and under the magnetizing effect of these impulses, it draws down the arm 6.

The arm 6 operates a pawl 7 (Figs. 1 and 6) which engages a ten-tooth ratchet-wheel 8, the said pawl being pivoted to a link 9 pivotally connected to an arm 10, mounted on the shaft of the ratchet-wheel, and having connected with it a spring 11. Each impulse in the solenoid 2 therefore advances the ratchet wheel 8 one tooth or causes it to make one complete revolution in an hour. A retaining pawl 12 is employed to prevent backward movement of the ratchet 8.

Fixed to the shaft of the ratchet-wheel 8 is a cam 13 with a single high point, and traveling on the periphery of this cam is a roller 14, carried by a lever 15 pivoted on shaft 17, and drawn toward the cam by a spring 16. As the cam is revolved step by step this lever is moved to the right and this movement is utilized to shift the minute knife-carriage towards the center of the instrument. This carriage, shown in Figs. 1, 6, 8 and 9, is a suitable frame carrying vertically movable knives 18, and having lateral lugs 19 through which pass the guide-rods 20 and depending lugs 21, through which pass the shafts and guide-rods 22, by which means the carriage, while permitted to move transversely, is held in proper alignment and position.

As shown in Fig. 2, there are two minute-knives on the same carriage, and the lever 15 is connected by a link 23 to a shaft 24, by a pivotal connection at 25. This shaft slides in projections 26 from the carriage and has a collar 27 secured thereon between which and the projecting lug 26 on the right is a coiled spring 28. As the lever 15 is moved step by step to the right in Fig. 6, it imparts its movement to the minute-knife carriage through the spring 28. Should it happen that a record is being taken by this operation of the knives at the moment that an impulse is passing through solenoid 2, which moves the lever 15, such movement is not interfered with but the carriage cannot move because the knife is down, but as soon as the carriage is released, the spring 28 which, by the movement of lever 15, has been compressed, throws the carriage forward one step.

The carriage carries in conjunction with each knife a pivoted lever 29 (Fig. 9). To this lever is connected a link 30 guided by a screw 31 passing through a slot therein and carrying at its lower end a roller 32 which lies immediately under a bar 33 extending across the machine. This bar, as best shown in Fig. 4, is depressed by a solenoid 34 which, when energized, draws down the arms 41 which carry this bar and are mounted on the shaft 22. From this it results that whenever the solenoid 34 is energized the minute-knife connected therewith in the manner described is drawn down.

Considering now Figs. 1, 6 and 7: As the minute-ratchet 8 is revolved and with it the cam 13, the lever 15 advances the carriage carrying the minute-knives step by step until the ratchet has made one complete revolution, when the roller 14 drops off the high point of the cam and the said carriage is returned to its original initial position. As this occurs once an hour, it is necessary to move the hour-knives through a space which will correspond to one hour, and this is done by the following means.

A bar 35 is pivoted to the lever 15 and at its opposite end it carries or operates in any proper manner a pawl 36 which engages with a ratchet-wheel 37 which has as many teeth as there are working hours in a day. Every backward movement of the lever 15, therefore, resulting from the roller 14 dropping off the high point of the cam 13, imparts to the ratchet-wheel 37 a movement corresponding to one tooth. On the shaft of the ratchet 37 is a cam 38 on the periphery of which travels a roller 40 carried by a lever 39, which is therefore moved intermittently to the left, moving one step for each tooth of the ratchet 37.

As will be seen from Fig. 2, there is a carriage at the end of the machine to the right exactly similar to the minute-knife-carriage and this carries two hour-knives 18. To this carriage the lever 39 is connected in the same manner that lever 15 is connected to the minute-knife-carriage, so that this hour-knife-carriage is advanced step by step, once each hour. The minute- and hour-knives on the "on" side of the machine are operated by the solenoid 34; that is to say, when this solenoid lowers the "on" cutting bar 33, it not only operates the minute-knife, but also the hour-knife at the opposite end of the instrument as this latter is provided with the same lever and link carrying a roller under the bar as has been above described.

The minute- and hour-knives on the "off" side of the machine are operated by a solenoid 42 through mechanism which is the counterpart of that hereinbefore described for the "on" side.

Referring now to the wiring diagram (Fig. 13) for an explanation of the operation of this device: The periodic impulses from the master clock come in on the line 43 and energize a relay magnet 44 which closes the contacts 45, and thereby brings current from a source 46, through wire 47, and directs such current through wire 48 to the solenoid 2, from which the current passes by wire 49 back to the source. The momentary energization of this solenoid operates the ratchet-wheel 8, as has been described, and by this means the knife-carriages are adjusted according to the time.

Figure 10:
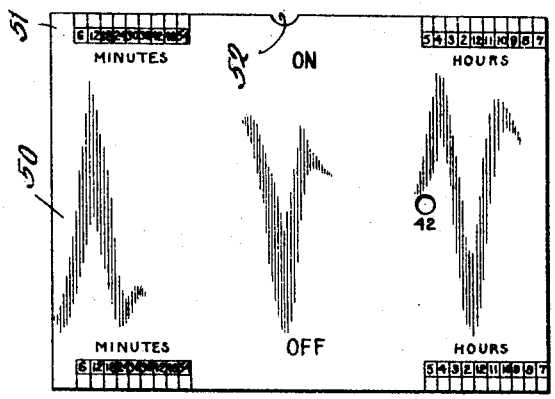
Figs. 10, 11 and 12 are views of the cards before cutting, partially cut and completely cut.

Assume now that a workman who starts to work on a job inserts his card 50 in the machine under the knives as shown in Fig. 1. This card is composed of the materials generally used for similar purposes and is preferably of the size and shape shown in Figs. 10 to 12. For convenience, it is or may be printed as shown. That is to say, along each side edge at one end there is a scale of as many equal parts as there are fractions of an hour at which the minute-knives are moved, and at the opposite end of the card are scales of as many equal parts as there are working hours in the day. The hour-scales extend to the extreme corners, but between the minute-scales and the corners are blank spaces 51, the purpose of which will be hereinafter explained. The card is guided so that the left-hand or minute-edge, in this case, lies in the path of the minute-knives for a distance equal to the width of the blank space 51, so that whenever the knives on either the "on" or the "off" side are operated, a section will be cut out from the corner of the card equal in extent to the blank space, and this without reference to the time at which this operation takes place. The object of this, as above stated, will fully appear from the subsequent description.

Figure 11:
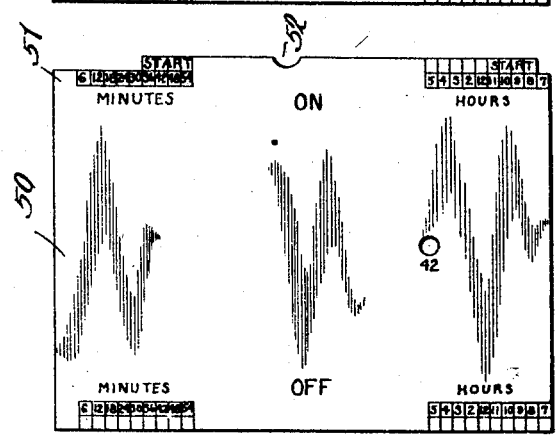

Every card has on its "on" edge a cut-away section 52 at a definite point. When the card, therefore, is fully inserted the end of a light pivoted lever 53 enters this notch or cut-out section and is not moved. A second arm 54, however, is encountered by the edge of the card and turned about its pivot 55 and thereby forces a contact spring 56 into engagement with a contact 57 which is similarly operated by the lever 53 but which has not been moved by that lever. The contact thus established carries the current through wire 58 to the center contact 59 of a three point switch. This contact by engagement with the uncut corner of the inserted card has been raised into engagement with the upper contact 60 and, hence, the path of the current is from the latter through wire 61 to a two point switch having contacts 62, 63, mechanically connected with the core of the solenoid 2, which is assumed at the moment to be closed, and thence by wire 64 to the upper contact blade 65 making contact with blade 66 of a two way switch operated by the core of the solenoid 34, through the coil of 34 and back to the source through wire 58. By this means this minute- and the hour-knives on the "on" side of the device are operated, and if we assume this operation occurred at 7:30 A. M., the "on" side of the card will be cut as shown in Fig. 11.

The energization of the solenoid 34 brings the center contact blade 66 down into contact with the lower blade 68 whereby the battery current is closed directly through wires 67 and 69, through the solenoid which therefore remains active until the card is withdrawn and the current broken by contacts 70 closed by an inserted card by a small lever 71, which is forced to one side by the edge of the card.

If on the finish of the job the card is again inserted into the machine, let us say the "off" side first, nothing will happen, for the lever 53 encountering the unnotched edge of the card will force the contact 57 to the right, so that contact 56 can never reach it. But if the card is inserted properly, then contacts 56 and 57 are closed and the current from battery passes through wire 58 to the middle contact 59 and thence to the lower contact 72 since the cut-away corner of the card 51 does not raise the contact 59, and thence to and through the contacts 73 controlled by a lever 74 bearing on the edge of the card, the two contacts 75 and 76 connected with the lower end of the core of the solenoid 2, and from there to the solenoid 42 and thence back to battery. Assuming that this operation occurred at 3:06 P. M., then the card will be cut as shown in Fig. 12.

The moment the knives on the "off" side have done their work the current of solenoid 42 is broken by the separation of the contacts 73 as the lever 74 drops forward as soon as the corner over the blank space 51ᴬ is cut away.

It is manifest that no card can be cut during the moment when the solenoid 2 is moving the ratchet and the knife carriages, as the movement of the core of this solenoid breaks the current of both solenoids 34 and 42 by the separation of the contacts which it controls. It will now be seen why the corner section of the minute end of the card must always be cut away irrespective of the time, for if it were not a second insertion of the card, or a third insertion, would operate the knives, which, of course, is not desired. As it is, a card once cut on either edge can never be cut again, and in order to preclude the possibility of a workman cutting his card in an attempt to beat the machine, I mount on the carriages type-bars and inking ribbon 77, the type being integral with the knives so that when the latter are depressed there will be printed on the margin of the cards in the first and second operations, respectively, the words "start" and "finish" immediately following the cut-out section. This is shown in Figs. 11 and 12.

Figure 12:
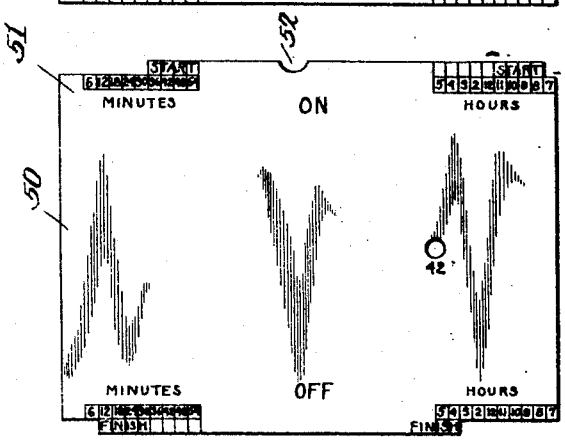

The cards, Fig. 12, are a permanent and accurate record of the elapsed time of a job. From them such time may be determined by measurement or by machines which might be adapted to secure and compute and record such time.

Having now described my invention, what I claim is:

1. In a recording machine, four knives in positions to cut out sections of varying lengths from the side edges of a workman's card at the four corners, in combination with time-controlled means for advancing the knives to positions corresponding to fractions of an hour and working hours, and means controlled by a card inserted into the machine for operating the said knives first on the "on" side and subsequently on the "off" side of the card.

2. In a recording machine, four knives in positions to cut out sections of varying lengths from the side edges of a workman's card at the four corners, time-controlled means for advancing the knives to positions corresponding to fractions of an hour, and working hours, means controlled by an uncut card for operating the knives on the "on" side of said card, and means controlled by a subsequently inserted cut card for operating the knives on the opposite or "off" side of the same card.

3. In a recording machine, in combination, two carriages movable towards the center of the machine, two knives on each carriage in positions to cut out sections of varying lengths from the side edges of a workman's card at the four corners, time-controlled means for advancing one carriage to position corresponding to fractions of an hour, and means controlled thereby for advancing the other carriage to positions corresponding to working hours, means controlled by an inserted uncut card for operating the minute and hour-knives on the "on" side, and means controlled by the subsequent insertion of a card so cut for operating the minute- and hour-knives on the "off" side of the machine or card.

4. In a recording machine, four knives in positions to cut out sections along the side edges of a workman's card at the four corners, the knives at one end being placed so as to cut out when operated before being advanced corner sections from one end of a card, in combination with time-controlled means for advancing one pair of knives towards the center of the machine in proportion to elapsed fractions of an hour and the other pair of knives towards the center of the machine in proportion to elapsed working hours, means controlled by an inserted uncut card for operating the knives on one side of the machine to cut out sections of lengths which indicate the starting time, and means controlled by a subsequently inserted cut card for operating the knives on the opposite side to cut out sections of lengths which indicate the finishing time of a job.

5. In a recording machine, four knives in position when operated to cut out according to their positions sections of varying lengths along the side edges of a workman's card at the four corners, time-controlled means for advancing the knives at one end in proportion to elapsed fractions of an hour, and the knives at the other end in proportion to elapsed working hours, a solenoid for operating the knives on the "on" side controlled in its operation by an inserted uncut card, a second solenoid for operating the knives on the "off" side by the subsequent insertion of the cut card, and circuit-controllers operated by the first named solenoid and the card to maintain the said solenoid energized as long as the card remains in the machine.

In testimony whereof I hereto affix my signature.

GEORGE WILLIAM ODELL.